UNITED STATES PATENT OFFICE.

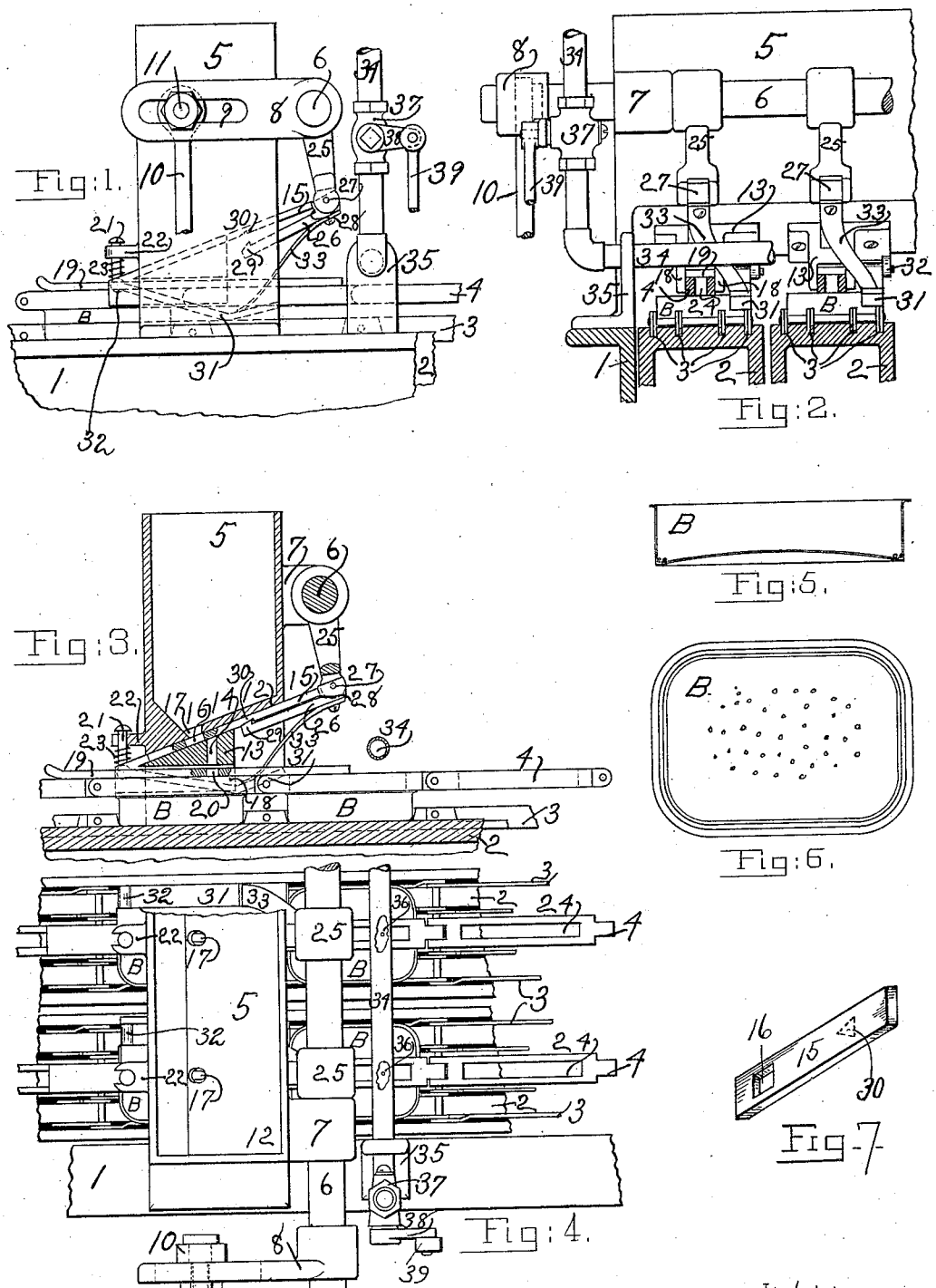

CHARLES W. SLEEPER, OF LANCASTER, NEW HAMPSHIRE.

SOLDER-FEEDING DEVICE FOR CAN-MAKING MACHINES.

No. 877,673.  Specification of Letters Patent.  Patented Jan. 28, 1908.

Application filed January 16, 1907. Serial No. 352,563.

*To all whom it may concern:*

Be it known that I, CHARLES W. SLEEPER, a subject of the King of Great Britain and Ireland, residing at Lancaster, in the county of Coos, State of New Hampshire, have invented certain new and useful Improvements in Solder-Feeding Devices for Can-Making Machines, of which the following is a description, reference being had to the accompanying drawings, forming a part hereof.

This invention relates to solder feeding mechanism for can soldering machines, and is designed for the purpose of feeding granulated solder in the solid form to the interior of can bodies and heads previously assembled and fed beneath the solder feeding device, as by means of a suitable moving chain, the soldering process being subsequently accomplished by melting the solder within the cans by heating means located exterior thereto.

My invention also comprises means for directing a jet of compressed air into the interior of the can body after solder has been supplied thereto and before it has been melted, in order to distribute the solder around the outer edge of the can bottom where the seam is to be formed.

My invention also comprises such further features of construction as are disclosed in the following specification and particularly specified in the concluding claim.

In the accompanying drawing,—Figure 1 is a side view in elevation of my invention. Fig. 2 is an end view, parts of the machine to which my device is attached being shown in section, and the device being illustrated as applied to a machine in which a plurality of can-feeding members are employed. Fig. 3 is a vertical section showing details of the solder feeding means. Fig. 4 is a plan view of a can soldering machine having my solder feeding device attached thereto, this view showing a machine having a plurality of can-feeding members as in Fig. 2. Figs. 5 and 6 are sectional and plan views of a can of a type made by machines with which I have used my invention and serving to illustrate the operation of the air blast hereinafter disclosed. Fig. 7 is a perspective view of an element of my device.

1 is a portion of the supporting frame of a can soldering machine to which I have shown my invention as attached, and 2 is a portion of a heated plate forming a part of said machine and acting to melt the solder within the cans as they traverse said plate.

3 is a feed chain moving in grooves in the plate 2 as shown, and acting to feed cans across said plate. This chain moves from left to right in the arrangement shown in Figs. 3 and 4.

4 is a second chain moving in unison with the chain 3, the links whereof rest upon the upper ends of the cans as they travel, the purpose of this second chain being to press the can body and head to be soldered thereto together while they are moved across the heated plate by the chain 3, and while the soldering operation is taking place, as is usual in can soldering machines of the type to which I have applied my invention; although it will be appreciated that my invention is applicable to other types of can soldering machines.

5 is a hopper adapted to contain finely divided solder in the solid form which may be prepared by granulating melted solder or by cutting solder previously formed into wire into small pieces or by other well known processes producing a like result. The hopper is supported from the frame of the machine and extends over the heated plate as shown, and the solder contained therein is fed to the cans as they pass beneath the hopper.

6 is an oscillating shaft journaled in supports projecting from one side of the hopper 5, one of which supports is shown at 7.

8 is an arm secured to the shaft 6 and slotted as shown at 9, and 10 is a pitman connected with the arm 8 by the bolt 11, which pitman is reciprocated from some moving member of the machine and transmits oscillating motion to the shaft 6.

Secured to the inclined bottom 12 of the hopper 5 is a securing and guiding member 13 frequently referred to hereinafter as a guide, provided with a passage 14; and between said guide and the bottom of the hopper is a feed slide 15. This slide is rectangular in cross-section and is secured in place and guided by the guiding member 13, as by resting within a suitable groove formed in the upper surface thereof; and it is provided with a feed pocket 16 extending therethrough.

The bottom 12 of the hopper is provided with an opening 17 out of line with the passage 14; and the arrangement of the opening 17, pocket 16, and passage 14 is such that in one position of the slide (as shown in Fig. 3) the feed pocket 16 is beneath the opening 17 and receives solder from the hopper, communication between the feed pocket and the passage 14 being interrupted at this time; while as the slide is moved to the right solder within the feed pocket will be carried over the upper end of the passage 14, and will fall therethrough into the can below. It will be evident that the quantity of solder supplied to the cans will be determined by the amount or extent of movement imparted to the slide 15 by means hereinafter disclosed, which movement may be regulated by varying the position of the bolt 11 in the slot 9.

The guide 13 is provided with downwardly extending side pieces 18, as shown in Fig. 2, which engage the sides of the chain 4; and resting upon said chain and held loosely in place by the members 18 is a shoe 19 having an opening 20 in line with the passage 14. This shoe is held against longitudinal movement by a pin 21 thereupon which engages a lug 22 on the side of the hopper, and it is pressed against the chain 4 by a spring 23. The links of the chain 4 are provided with longitudinally extending openings 24 to allow the solder to drop through the chain into the cans. Motion is transmitted to the slide 15 from the shaft 6 by means of an arm 25 upon said shaft and a latch member 26 pivotally secured at 27 to said arm. This latch has a shoulder 28 adapted to engage the end of the slide, and a hook 29 adapted to engage a notch 30 in the under side of the slide. It will be evident that when the parts are in the position shown in Fig. 3 motion in both directions will be imparted to the slide as the shaft 6 is oscillated.

31 is a trail member, one end thereof being pivotally secured at 32 to the guide member 13 and the other end resting upon the upper end of the cans as they pass beneath the solder feeding mechanism.

33 is a spring, one end thereof being secured to the latch member 26 and the free end thereof extending to and resting upon the upper surface of the free end of the trail member 31. From the above it will be evident that so long as cans are passing through the machine the engagement of the upper ends of the cans with the free end of the trail member will keep said member in its elevated position as shown in Fig. 3, and, through the spring 32, will maintain the latch member 26 in position to transmit motion in both directions to the slide 15. If, however, the supply of cans is interrupted or ceases, the free end of the trail member will fall, thus disengaging the hook 29 and notch 30; after which the slide will not be moved t the right, and the supply of solder will cease until the free end of the trail member is again elevated. This condition is illustrated in Fig. 1.

In the drawings a series of cans B are shown as passing through the machine; and, the parts being so adjusted that movement of the slide 15 takes place when the cans are beneath the solder feeding device, it will be evident that solder will be supplied to the interior of each can as it passes beneath said device, and will be distributed over the bottom thereof something as shown in Fig. 6. In order to distribute the solder around the edges of the can where the seam is to be formed, and in the manner shown in Fig. 5, I provide means whereby a jet of compressed air is directed downward against the bottom of the can after the solder has been supplied thereto and before it has been melted to blow the solder to the periphery of the can bottom, as shown in Fig. 5. To this end I provide a compressed air supply pipe 34 carried by suitable supports upon the frame of the machine, one of which is shown at 35.

36 is an opening in the under side of the pipe 34, and 37 is a valve in said pipe.

38 is an arm by which the valve may be operated, and 39 is a pitman adapted to be reciprocated from any moving member of the machine. These parts are so adjusted that the valve 37 will be opened when the cans are beneath the pipe 34, whereupon a jet of compressed air from the openings 36 will be directed against the bottom of the can to blow the solder from the central position in which it falls, as indicated in Fig. 6, to the periphphery where the seam is to be formed, as shown in Fig. 5.

While in describing my device and explaining its operation, I have referred to a single series of cans as passing beneath a single solder-feeding device, it is my usual practice to arrange a plurality (and as many as may be desired) of such devices side by side as shown in Figs. 2 and 4, the whole constituting a single machine.

Having thus described my invention and explained the mode of operation thereof, I claim, and desire to secure by Letters Patent:

1. In a solder feeding device, a hopper for containing granulated solder; a chain for feeding cans to be soldered beneath said hopper; a second chain adapted to rest upon the tops of the cans and to move with them; openings in the links of said second chain; a passage leading from said hopper and adapted to discharge solder through said openings and into the interior of the cans; and means for controlling the flow of solder through said passage.

2. In a solder feeding device, a hopper for containing granulated solder; a chain for feeding cans to be soldered beneath said hopper; a second chain adapted to rest upon the tops of the cans and to move with them; a shoe adapted to rest upon said second chain;

an opening through said shoe; openings in the links of said second chain; a passage leading from said hopper and adapted to discharge solder through the opening in said shoe and the openings in the links of said second chain and into the interior of the cans; and means for controlling the flow of solder through said passage.

3. In a solder feeding device, a hopper for containing granulated solder; means for feeding cans to be soldered beneath said hopper; a passage leading from said hopper and adapted to discharge solder into the interior of the cans; a reciprocating slide for controlling the flow of solder through said passage; an oscillating shaft carried in bearings upon said hopper; an arm upon said shaft adapted to operate said slide; a second arm upon said shaft; and a pitman adapted to be operated from a moving part of the machine and connected with said second arm.

4. In a solder feeding device, a hopper for containing solder; means for feeding cans to be soldered beneath said hopper; a passage leading from said hopper and adapted to discharge solder; means for controlling the flow of solder through said passage; means adapted to engage said controlling means and to move with it throughout its range of movement; and means for disengaging said operating and controlling means when there is no can beneath the hopper.

5. In a solder feeding device, a hopper for containing solder; means for feeding cans to be soldered beneath said hopper; a passage leading from said hopper and adapted to discharge solder; means for controlling the flow of solder through said passage; means adapted to engage said controlling means and to move with it throughout its range of movement; and means dependent for its operation upon the absence of a can beneath the hopper for disengaging said operating and controlling means.

6. In a solder feeding device, a hopper for containing granulated solder; means for feeding cans to be soldered beneath said hopper; a passage leading from said hopper and adapted to discharge solder into the interior of the cans; a reciprocating slide for controlling the flow of solder through said passage; means normally disconnected from said slide for effecting the operation thereof; means for locking said slide and operating means together; and means engaged by the cans as they pass beneath said hopper for maintaining said locking member in position to lock said operating means and slide together.

7. In a solder feeding device, a hopper for containing granulated solder; means for feeding cans to be soldered beneath said hopper; a passage leading from said hopper and adapted to discharge solder into the interior of the cans; a reciprocating slide for controlling the flow of solder through said passage; means normally disconnected from said slide for effecting the operation thereof; a latch pivotally connected with said operating member and adapted to lock said member and said slide together; and means engaged by the cans as they pass beneath said hopper for maintaining said latch in position to lock said operating member and slide together.

8. In a solder feeding device, a hopper for containing granulated solder; means for feeding cans to be soldered beneath said hopper; a passage leading from said hopper and adapted to discharge solder into the interior of the cans; a reciprocating slide for controlling the flow of solder through said passage; an oscillating shaft supported in bearings upon said hopper; an arm carried by said shaft; a latch pivotally connected with said arm and adapted to lock said arm and slide together; a pivoted trail member in position to be engaged by the cans as they pass beneath the hopper; and a spring extending between said latch and trail member.

9. In a solder feeding device, a hopper for containing granulated solder; means for feeding cans to be soldered beneath said hopper; a passage leading from said hopper and adapted to discharge solder into the interior of the cans; a reciprocating slide for controlling the flow of solder through said passage; an oscillating shaft supported in bearings upon said hopper; an arm carried by said shaft; a latch pivotally connected with said arm; a shoulder upon said latch adapted to engage the end of said slide to move it inward; a hook upon said latch adapted to engage a notch in said slide to move it outward; a spring secured to said latch; and a pivoted trail member in position to be engaged by the cans as they pass beneath the hopper, the free end thereof being in engagement with the free end of the spring aforesaid.

10. In a solder feeding device, means for feeding granulated solder to the interior of a can, the head of which is to be soldered to the body portion; and means for directing a stream of compressed air into the can after the solder has been supplied thereto and as it rests upon the head thereof, whereby the solder will be blown to the periphery of the can where the seam is to be formed.

11. In a solder feeding device, a hopper for containing granulated solder; means for feeding cans beneath said hopper; means for feeding solder from said hopper to the interior of the cans as they pass beneath said hopper; a conduit for conveying compressed air located adjacent said hopper; and openings in said conduit adapted to discharge a jet of compressed air downward into the interior of the cans after the solder has been supplied thereto.

12. In a solder feeding device, a hopper for containing granulated solder; means for feeding cans beneath said hopper; means for feeding solder from said hopper to the interior of the cans as they pass beneath said hopper; a conduit for conveying compressed air located adjacent said hopper; openings in said conduit adapted to discharge a jet of compressed air downward into the interior of the cans after the solder has been supplied thereto; a valve for controlling the flow of air through said conduit; and means operated from a moving part of the machine for operating said valve.

13. In a solder feeding device, a hopper for containing granulated solder; an opening in the bottom thereof; a guide secured to the bottom of said hopper; a passage extending through said guide, said passage being out of line with said opening; a reciprocating feed slide held between said guide and bottom; a feed pocket in said slide; a chain for feeding cans beneath said hopper; a second chain adapted to rest upon the cans and to move with them; projections extending downwardly from said guide and engaging the sides of said second chain; a shoe resting upon said second chain and extending between said projections; and an opening in said shoe registering with the passage in said guide.

14. In a solder feeding device, a hopper for containing solder; means for feeding cans to be soldered beneath said hopper; a passage leading from said hopper; a reciprocating slide for controlling the flow of solder through said passage; an oscillating shaft carried in bearings upon said hopper; an arm upon said shaft adapted to operate said slide; a second arm upon said shaft; and a pitman adapted to be operated from a moving part of the machine and connected with said arm.

15. In a solder feeding device, a hopper for containing solder; means for feeding cans to be soldered beneath said hopper; a passage leading from said hopper; a reciprocating slide for controlling the flow of solder through said passage; means normally disconnected from said slide for effecting the operation thereof; means for locking said slide and operating means together; and means engaged by the cans as they pass beneath said hopper for maintaining said locking member in position to lock said operating means and slide together.

16. In a solder feeding device, a hopper for containing solder; means for feeding cans to be soldered beneath said hopper; a passage leading from said hopper; a reciprocating slide for controlling the flow of solder through said passage; means normally disconnected from said slide for effecting the operation thereof; a latch pivotally connected with said operating member and adapted to lock said member and said slide together; and means engaged by the cans as they pass beneath said hopper for maintaining said latch in position to lock said operating member and slide together.

17. In a solder feeding device, a hopper for containing solder; means for feeding cans to be soldered beneath said hopper; a passage leading from said hopper; a reciprocating slide for controlling the flow of solder through said passage; an oscillating shaft supported in bearings upon said hopper; an arm carried by said shaft; a latch pivotally connected with said arm and adapted to lock said arm and slide together; a pivoted trail member in position to be engaged by the cans as they pass beneath the hopper; and a spring extending between said latch and trail member.

18. In a solder feeding device, a hopper for containing solder; means for feeding cans to be soldered beneath said hopper; a passage leading from said hopper; a reciprocating slide for controlling the flow of solder through said passage; an oscillating shaft supported in bearings upon said hopper; an arm carried by said shaft; a latch pivotally connected with said arm; a shoulder upon said latch adapted to engage the end of said slide to move it inward; a hook upon said latch adapted to engage a notch in said slide to move it outward; a spring secured to said latch; and a pivoted trial member in position to be engaged by the cans as they pass beneath the hopper, the free end thereof being in engagement with the free end of the spring aforesaid.

This specification signed and witnessed this second day of January A. D. 1907.

CHARLES W. SLEEPER.

In the presence of—
Geo. N. Kent,
Bernice A. Lyman.